US008468755B2

(12) United States Patent
Zuritis (10) Patent No.: US 8,468,755 B2
(45) Date of Patent: Jun. 25, 2013

(54) SOLAR ARRAY SUPPORT STRUCTURE

(76) Inventor: Michael Zuritis, Ballston Lake, NY (US)

(*) Notice: Subject to any disclaimer, the term of this patent is extended or adjusted under 35 U.S.C. 154(b) by 150 days.

(21) Appl. No.: 12/885,591

(22) Filed: Sep. 20, 2010

(65) Prior Publication Data

US 2011/0067749 A1  Mar. 24, 2011

Related U.S. Application Data

(60) Provisional application No. 61/244,977, filed on Sep. 23, 2009.

(51) Int. Cl.
E04G 21/14 (2006.01)
(52) U.S. Cl.
USPC .................. 52/173.3; 52/153; 52/160; 52/165
(58) Field of Classification Search
USPC ......... 52/173.3, 153–160, 165; 405/229–230, 405/249–251, 244, 259.1; 136/246; 29/525.01, 29/700; 248/218.4, 219.1, 219.4, 230.2, 161, 248/163.1, 176, 530
See application file for complete search history.

(56) References Cited

U.S. PATENT DOCUMENTS

| | | | | |
|---|---|---|---|---|
| 1,373,560 A | * | 4/1921 | Holland ........................... | 52/153 |
| 4,269,173 A | * | 5/1981 | Krueger et al. ................ | 126/634 |
| 4,279,104 A | * | 7/1981 | Classen ............................. | 52/38 |
| 4,833,846 A | | 5/1989 | McFeetors et al. | |
| 4,966,631 A | * | 10/1990 | Matlin et al. ................... | 136/244 |
| 5,058,337 A | * | 10/1991 | O'Connor ........................ | 52/162 |
| 5,125,608 A | * | 6/1992 | McMaster et al. ......... | 248/163.1 |
| 5,906,077 A | * | 5/1999 | Andiarena ........................ | 52/157 |
| 6,334,596 B1 | * | 1/2002 | Temple .......................... | 248/156 |
| 6,343,446 B1 | * | 2/2002 | Beard .............................. | 52/165 |
| 6,474,028 B2 | * | 11/2002 | Cusimano et al. .............. | 52/153 |
| 6,722,357 B2 | * | 4/2004 | Shingleton .................... | 126/600 |
| 6,766,992 B1 | * | 7/2004 | Parker ........................... | 248/300 |
| 6,922,954 B2 | * | 8/2005 | Bradley et al. .................. | 52/162 |
| 7,416,367 B2 | | 8/2008 | St. Onge et al. | |
| 7,531,741 B1 | * | 5/2009 | Melton et al. ................. | 136/246 |
| 7,841,117 B2 | * | 11/2010 | Smith ......................... | 40/607.05 |
| 2009/0277368 A1 | * | 11/2009 | Bulloch ..................... | 114/230.2 |
| 2010/0123067 A1 | * | 5/2010 | Cardenas ..................... | 248/530 |

* cited by examiner

Primary Examiner — William Gilbert
Assistant Examiner — Beth Stephan
(74) Attorney, Agent, or Firm — Schmeiser, Olsen & Watts, LLP (57) ABSTRACT

Disclosed herein is a solar array support structure that includes a mounting structure extending a length and configured to receive a solar array. The solar array support structure further includes a support column extending from the mounting structure into a ground. Moreover, the solar array support structure includes a lateral force resistance component in communication with the support column in the ground, the lateral force resistance component being dimensioned to reduce pressure on the ground from a force transmitted by the support column in a first direction and a second opposite direction more so than any other two opposite directions located in the same plane as the first and second opposite directions.

20 Claims, 6 Drawing Sheets

SOLAR ARRAY SUPPORT STRUCTURE

RELATED APPLICATION

The present invention is a non-provisional claiming priority to a commonly owned U.S. Provisional Patent Application Ser. No. 61/244,977, filed Sep. 23, 2009, of Zuritis, entitled "Solar Array Support Structure," the disclosure of which is herein incorporated by reference to the extent not inconsistent with the present disclosure.

FIELD OF TECHNOLOGY

The subject matter disclosed herein relates generally to solar arrays. More particularly, the subject matter relates to a ground installed solar array support structure having a lateral force resistance apparatus.

BACKGROUND

Renewable energy sources are becoming more popular with the rising cost of oil and other non-renewable energy resources. Solar energy is one of these renewable energy sources and has proven desirable to harness in many circumstances. One method of harnessing solar energy is to install a structural array of solar panels, or a solar array, such that the solar panels each face the sun to achieve sunlight absorption. It is often desirable to install a solar array structure having support columns that extend directly into the ground. These support columns have three functions: (1) provide bearing for snow, wind and the inherent weight of the structure; (2) provide uplift prevention caused by wind force; and (3) provide lateral restraint for wind. Because of high lateral loading due to wind, thick and expensive support columns must often be utilized in the construction of solar array support structures.

Thus, an improved solar array support structure would be well received in the art.

SUMMARY

According to a first described aspect, a solar array support structure comprises: a mounting structure extending a length and configured to receive a solar array; a support column extending from the mounting structure into a ground; and a lateral force resistance component in communication with the support column in the ground, the lateral force resistance component being dimensioned to reduce pressure on the ground from a force transmitted by the support column in a first direction and a second opposite direction more so than any other two opposite directions located in the same plane as the first and second opposite directions.

According to a second described aspect, a method of installing a solar array comprises introducing a support column at least partially into the ground, wherein the support column is configured to support a mounting structure and an accompanying solar array; driving the support column to a desired position in the ground; and attaching a lateral force resistance component to the support column, the lateral force resistance component being dimensioned to reduce pressure on the ground from a force transmitted by the support column in a first direction and a second opposite direction more so than any other two opposite directions located in the same plane as the first and second opposite directions.

According to a third described aspect, a kit for erecting a solar array support structure comprises at least two horizontal rails; a plurality of mounting bars installable on top of the at least two horizontal rails such that the plurality of mounting bars are configured to receive an attachable solar array; at least one support column attachable to the horizontal rail; and at least one lateral force resistance components attachable to the support column, the lateral force resistance component being dimensioned to reduce pressure on the ground from a force transmitted by the support column in a first direction and a second opposite direction more so than any other two opposite directions located in the same plane as the first and second opposite directions when the lateral force resistance component is attached to the support column and installed in the ground.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
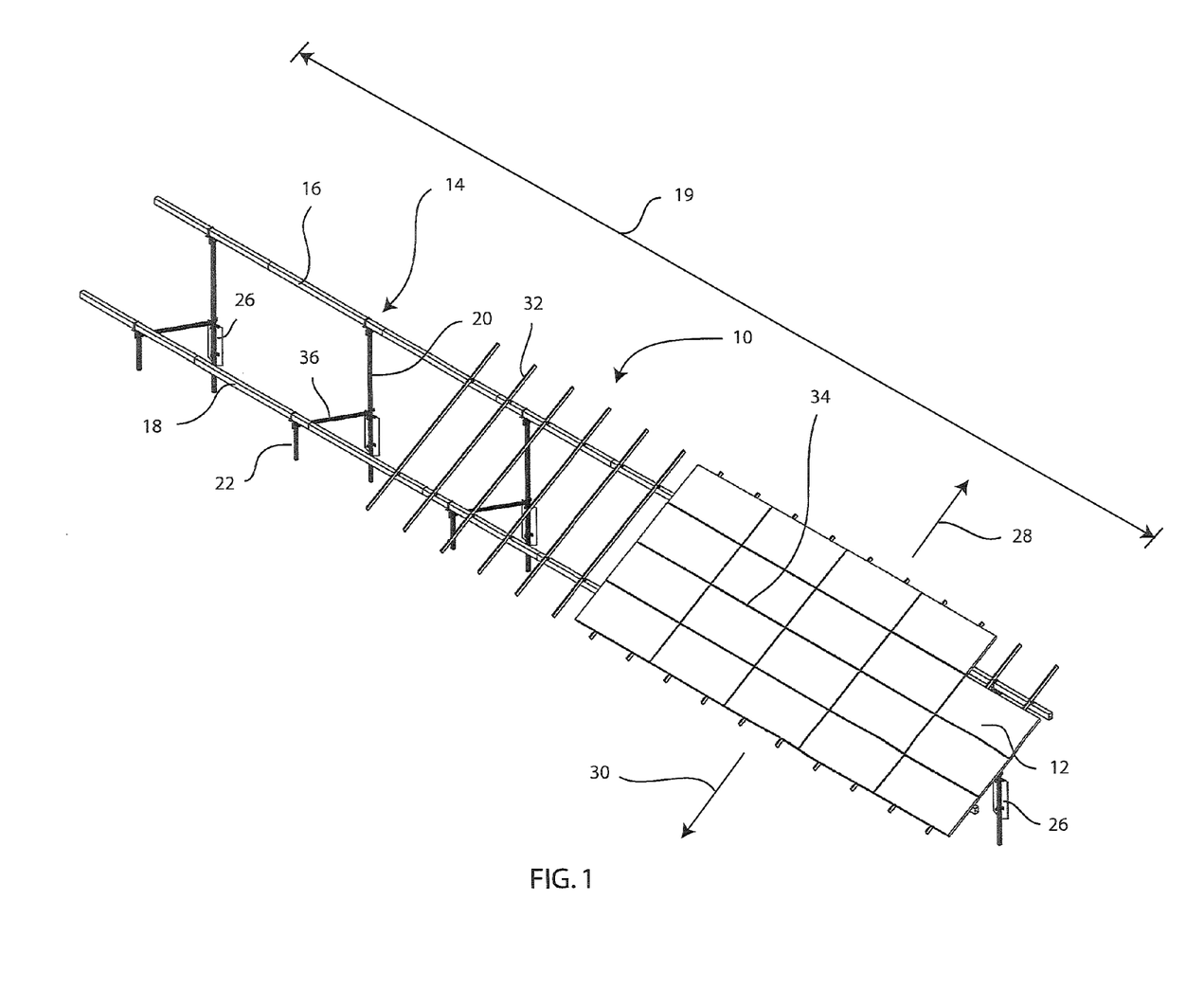
FIG. 1 depicts a perspective view of a solar array support structure in accordance with one embodiment of the present invention.
Figure 2:
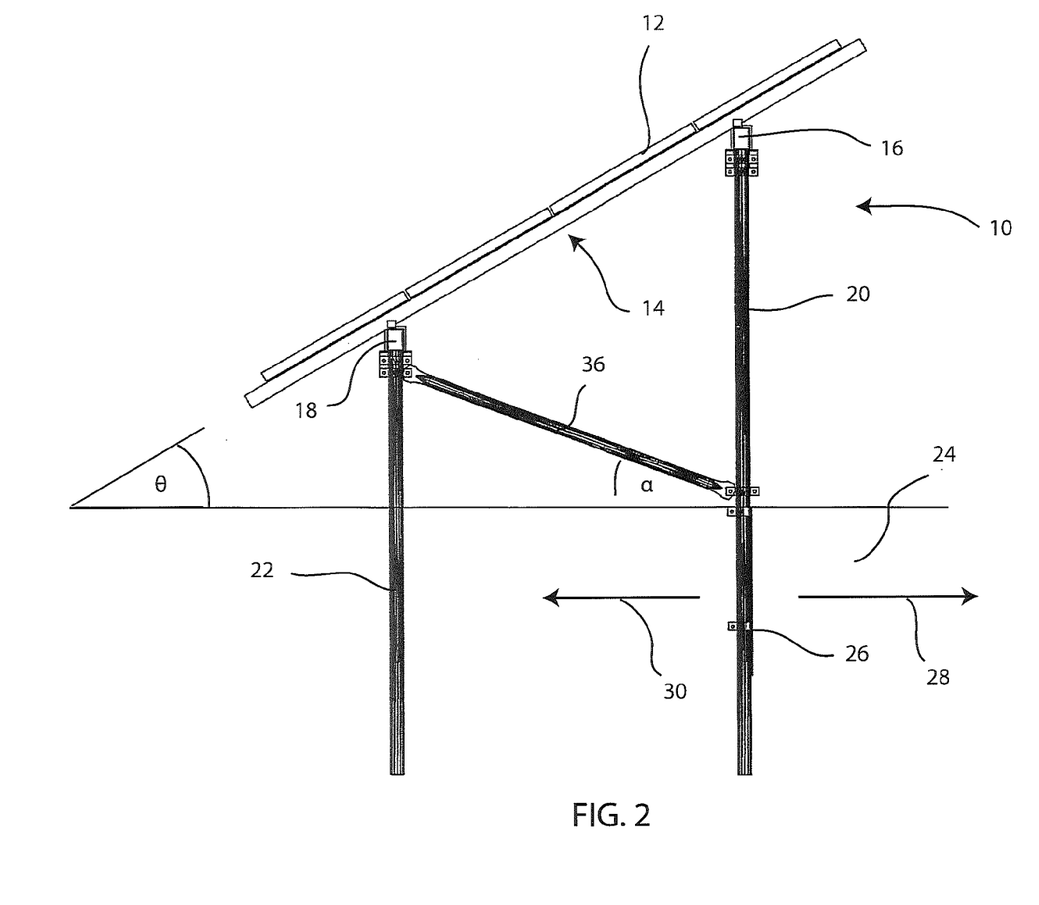
FIG. 2 depicts a side view of the solar array support structure of FIG. 1 after installation into a ground in accordance with one embodiment of the present invention.

Referring firstly to FIGS. 1 and 2, a solar array support structure 10 is shown according to one described embodiment, after having been installed in the ground 24 and having a partial array 34 of solar panels 12 mounted thereon. The solar array support structure 10 includes a mounting structure 14 configured to receive the solar panels 12 such that the solar panels 12 are each tilted at a predetermined angle θ that may maximize sunlight absorption. The mounting structure 14 comprises a top horizontal rail 16 and a bottom horizontal rail 18 running a length 19 of the solar array. A plurality of rear support columns 20 extend substantially vertically from the top horizontal rail 16 while a plurality of front support columns 22 extend substantially vertically from the bottom horizontal rail 18. These support columns 20, 22 are installed into the ground 24 such that the solar array support structure 10 is secured therein. Lateral force resistance components 26 having a substantially planar profile are attached to each of the rear support columns 20 such that they extend tangentially from the support columns 20 parallel with the horizontal rails 16. While the lateral force resistance components 26 are shown attached to the rear support columns 20, it should be understood that the lateral force resistance components 26 may also be attached to the front support columns 22. When the solar array support structure 10 is installed in the ground 24, the lateral force resistance components 26 are configured to reduce pressure on the ground 24 from a force transmitted by the rear support column 20 in a first direction 28 and a second opposite direction 30 more so than any other two opposite directions located in the same plane as the first and second opposite directions 28, 30. Due to the design and construction of the solar array support structure 10, wind hitting the installed solar array 34 will chiefly result in the lateral forces being exerted on these support columns 20 in these two directions 28, 30. The lateral force resistance components 26 are thereby configured to prevent the support columns 20 from becoming loose in the ground 24 due lateral movement caused by the wind.

In the embodiment shown, the mounting structure 14 includes top mounting bars 32 that are installed above the horizontal rails 18, 20. These top mounting bars 32 are attached to the horizontal rails 18, 20 to make the predetermined angle θ with the ground 24. The solar panels may thereafter be installed on top of these top mounting bars 32 to create a tilted planar solar array 34, as shown partially installed in FIG. 1. It will be understood to those skilled in the art that any appropriate attachment mechanisms to secure the top mounting bars 32 to the horizontal rails 18, 20 are contemplated. Additionally, any attachment mechanism, such as clamps, may be used to mount the solar panels 12 to the top mounting bars 32. In one embodiment, the panels may simply slide into the top mounting bars 32 without clamps. It should further be understood that the construction of the mounting structure 14 is not limited to the embodiment shown. The array tilt angle, size, or orientation of the solar array 34 and mounting structure 14 may be customizable for each solar array support structure 10. For example, by raising or lowering the rear support columns 20 with respect to the front support columns 22 in the construction of the solar array support structure 10, the predetermined angle θ and the tilt of the solar array may be customized in this way. Furthermore, by adding additional support columns behind the rear support column 20, or simply spreading out the support columns 20, 22, the solar array 34 may likewise be extended to have a greater width. In another embodiment contemplated, the mounting structure 14 may be a planar sheet of material (not shown) rather than including any top mounting bars 32 or horizontal rails 18, 20.

The horizontal rails 16, 18 and the top mounting bars 32 of the mounting structure 14 may be manufactured from aluminum or steel or other like materials and may have generally rectangular cross sections, as shown in the Figures. The horizontal rails 16, 18 are shown hollowed while the top mounting bars 32 are thin, solid components. The horizontal rails 16, 18 may be more structurally robust than the top mounting bars 32 in order to better support the load of the entire length of the solar array 34. However, the embodiment shown is not limiting. For example, the mounting structure may comprise components having circular cross sections. Furthermore, the terms "rail" and "bar" are used for illustrative purposes to describe the mounting rails 16, 18 and the top mounting bars 32. It should be understood that the mounting structure 14 may comprise bars, rails, poles, shafts, pipes, tubes, beams and the like in any configuration that would be apparent to those skilled in the art. Again, these components may not be necessary in an embodiment where the mounting structure 14 is a planar sheet of material, as described hereinabove.

Whatever the construction of the mounting structure 14, the vertical support columns 20, 22 are configured to hold it above the ground 24 when the solar array support structure 10 is installed. In the embodiment shown in the Figures, the vertical support columns 20, 22 are connected to the horizontal rails 16, 18 at regular intervals and extending therefrom to the ground 24. The vertical support columns 20, 22 may also be pairs of vertical support columns 20, 22, each pair comprising one of the front support columns 22 and one of the rear support columns 20. Each pair may be located at the same point along the length 19 of the mounting structure 14. The vertical support columns 20, 22 may be hollow steel pipes having a circular cross section, as shown in the Figures. Other embodiments are contemplated. For example, the support columns 20, 22 may be telescoping such that they height above the ground and angles are adjustable. Alternately, a plurality of steel pipes may comprise each individual support column 20, 22. The support columns 20, 22 may also have square or rectangular cross sections or the like. These embodiments are exemplary and should not be interpreted as limiting in any way.

Additionally, the solar array support structure 10 may only include a single vertical support column. For example, in one embodiment, the solar array support structure 10 is a single point structure having one robust and thick support column designed to bear the load of the entire mounting structure 14 and solar array 32. Additionally, solar array support structure 10 may be automatically adjustable in tilt and height. The vertical support column or columns may be integral components of this adjustable system.

These vertical support columns 20, 22 may also include helical drives (not shown) at the rooted end to enable the columns 20, 22 to be driven into the ground 24 through rotation during the installation of the solar array support structure 10. These helical drives may also support the solar array support structure 10 in order to bear the vertical loading caused by the wind (both downward and upward), snow, weight of the structure, and the like. Alternately, driven piles or concrete masses may be utilized to sustain the vertical loading on these vertical support columns 20, 22.

A cross support bar 36 is attached between each pair of vertical support columns 20, 22 to transfer lateral load from the mounting structure 14 to the base of the rear support column 20. Each of the cross support bars 36 is shown attached to the front support column 22 proximate the mounting structure 14. The cross support bars 36 extend to the lower portion of the rear support column 20 and attach thereto at a location proximate to the ground when the ground installable solar array support structure 10 is installed. The cross support bars 36 are configured to mechanically transfer a substantial portion of the lateral load on the solar array 34 to the rear support column 20. The angle α of the cross support bars 36 with the ground may vary depending on the attachment locations to the support columns 20, 22. It should be understood that any connection mechanism may be used to attach the cross support bar 36 to the support columns 20, 22. Additionally, the cross support bar 36 may not be a necessary component of the mounting structure 14. For example, the solar array support structure 10 may simply include the support columns 20, 22 made of thicker, more robust steel, without utilizing these cross support bars 36. However, the cross support bar 36 may reduce the stress on the support columns 20, 22 caused by wind, thereby reducing material cost without sacrificing structural integrity of the system. Furthermore, the cross support bars 36 transmit horizontal loading on the system to the rear support column 20, increasing the effectiveness of the lateral force resistance components 26 in securing the solar array support structure 10 within the ground.

Figure 3:
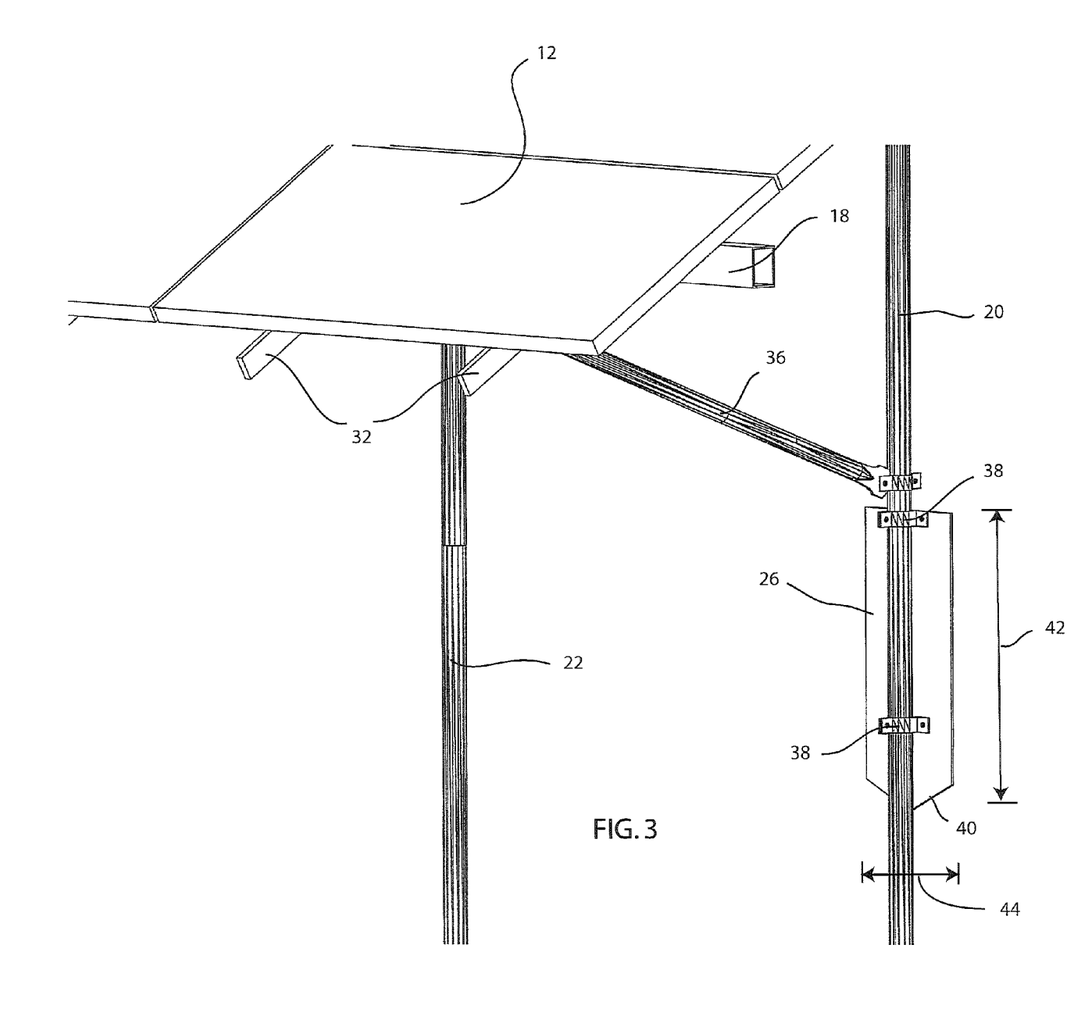
FIG. 3 depicts a perspective view of a lateral force resistance component attached to a support column of the solar array support structure of FIGS. 1 and 2 in accordance with one embodiment of the present invention.
Figure 4:
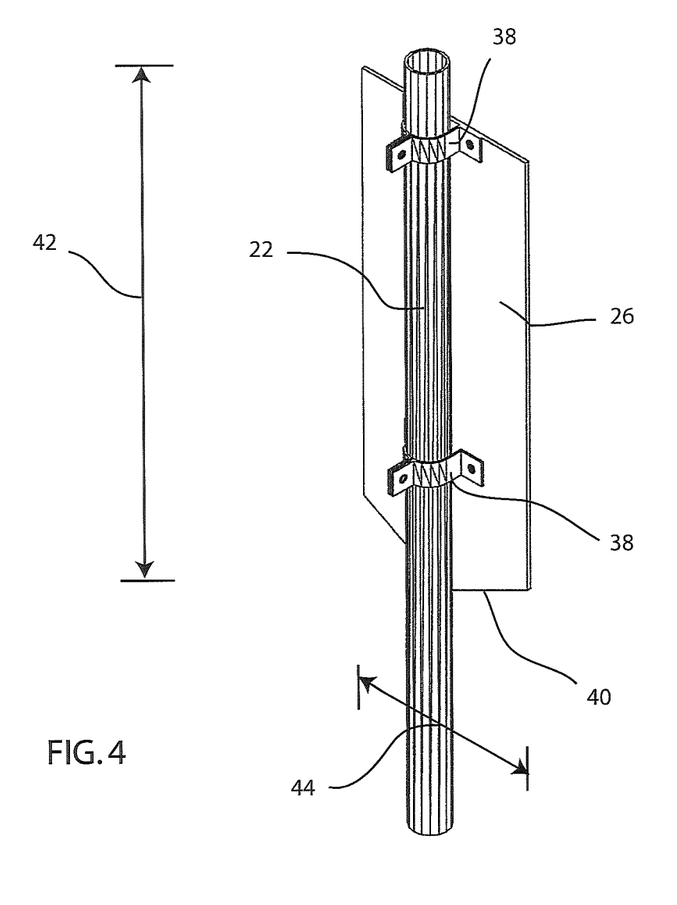
FIG. 4 depicts a perspective view of the lateral force resistance component of FIG. 3 attached to the support column of the solar array support structure in accordance with one embodiment of the present invention.
Figure 5:
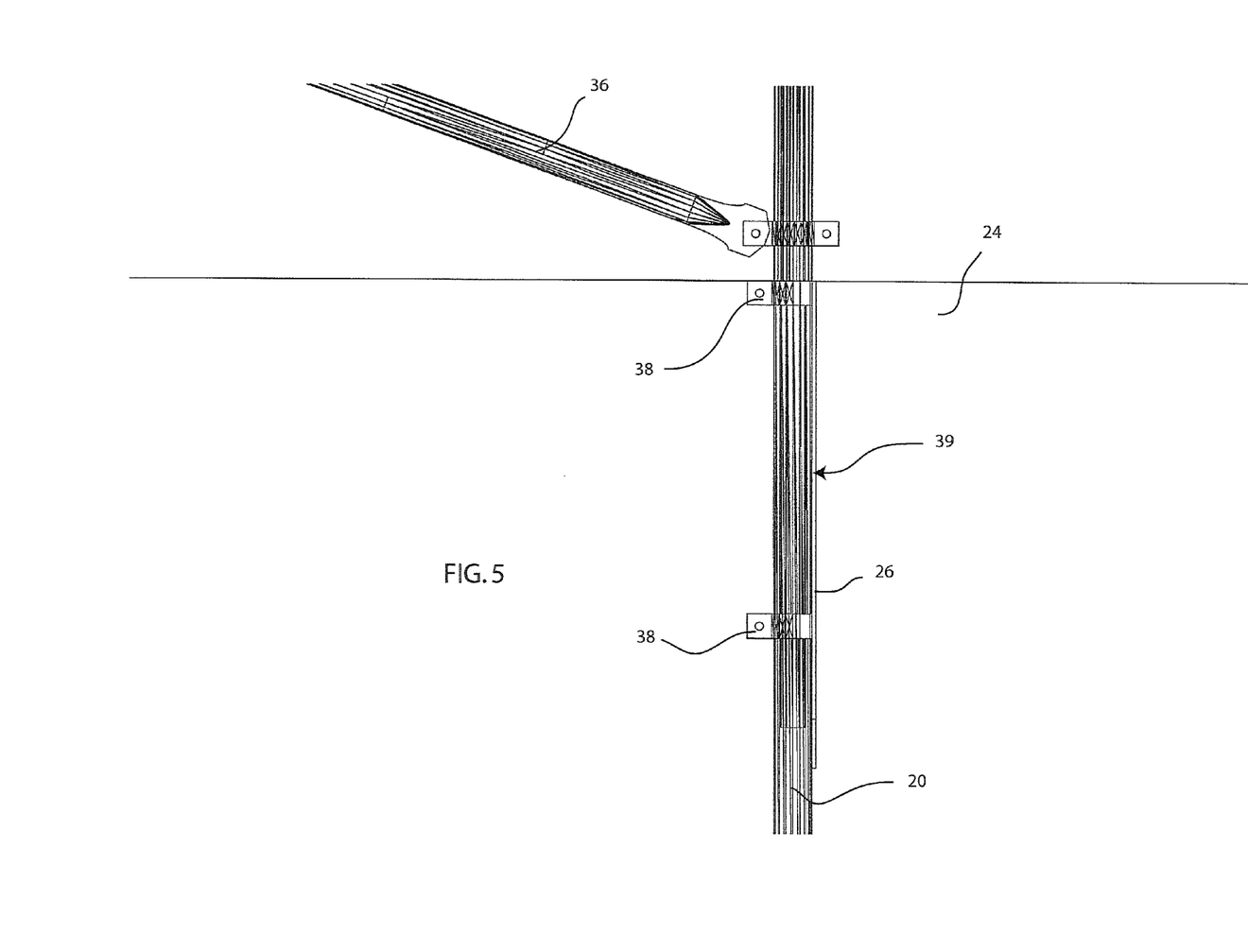
FIG. 5 depicts a side view of the support column having the attached lateral force resistance component of FIGS. 3 and 4.

Referring now to FIGS. 3-5, one of the lateral force resistance components 26 is shown more closely according to one described embodiment. The lateral force resistance component 26 is attached with two clamps 38 such that it extends tangentially from the rear support column 20, parallel with the horizontal rails 16 and solar array 34, and perpendicular with the cross support bar 36 and the top mounting bars 32. In one embodiment, the clamps 38 may be replaced with U-bolts which attach the lateral force resistance component 26 to the support columns 20. The lateral force resistance component 26 is a planar plate extending a first vertical length axially along the support column 20 in the embodiment shown. The lateral force resistance component 26 also extends a second horizontal width tangentially from the support column 20. Preferably, the lateral force resistance component 26 is made of steel. However, other materials are contemplated, such as Fiberglass, plastic, wood, iron, bronze, composites and the like.

When wind traveling in the first direction 28 hits the front of the solar array 34, for example, force is transmitted to the support columns 20, 22. Horizontal force is then particularly transmitted through the cross support bar 36 to the base of the rear support column 20. As described hereinabove, the lateral force resistance components 26 are configured to reduce the pressure on the ground from this force transmitted, applied, or otherwise originating from the rear support column 20 in the first direction 28. This is achieved by increasing the surface area on which the rear support columns 20 transmit force on the surrounding ground 24. Alternately, when wind coming from the second direction 30 hits the under surface of the solar array, the lateral force resistance components 26 are similarly configured to reduce pressure on the ground transmitted by the rear support column 20 in the second direction 30. The first and the second direction may thus be perpendicular to the length 19 of the solar array support structure 10 and parallel with the cross support bars 36.

In the embodiment shown, the lateral force resistance components 26 may not reduce the pressure on the ground with exactly equal effectiveness in the first and second directions 28, 30 because the rear support column 20 and clamps 38 are only located on one side of the lateral force resistance components 26 while only the flat plate is located on the other side. This possible difference in structure between the two sides of the lateral force resistance component may have an effect on the amount of reduction of pressures on the ground in the first and second direction when the forces in those directions are equal. However, the lateral force resistance components 26 reduce the pressure on the ground from a force transmitted from the rear support column 20 in these directions more than any other two opposite directions located in the same plane as the first and second opposite directions 28, 30. Any embodiment is contemplated that has these two opposite directions of optimum pressure reduction effectiveness, where the two directions are perpendicular to the length 19 of the solar array 34.

The lateral force resistance components 26 are shown in the Figures to be attached to a rear side 39 (shown in FIG. 5) of the rear support column 20. This may reduce the amount of stress on the clamps 38 or other attachment apparatus when wind is traveling in the first direction 28. Thus, the embodiment shown is optimized for situations where the wind travels in this first direction 28 more often than the second direction 30. However, the lateral force component may be attached tangentially to the opposite side of the support columns 20, 22 in a situation where the force transmitted by the support columns will more often be in the second direction 30. While the embodiment depicted includes lateral force resistance components 10 attached to the rear support column 20 only, it should be understood that other solar array support structures may include lateral force resistance components on any or all of the support columns.

Furthermore, any attachment mechanism of the lateral force resistance component 26 with the support columns 20, 22 is contemplated. For example, the lateral force resistance components 26 may be integrally welded to the support columns, attached by an adhesive, fastener, clamp, screw or bolt assembly, and the like. For example, in one embodiment, two plates are integrally welded to opposite sides of the support column. Thus, the lateral force resistance components 26 may or may not be attached tangential to the support columns 20, 22 as shown in the Figures. Further, as previously described, the lateral force resistant components 20, 22 may be attached to the support columns 20, 22 with U-bolts.

A bottom edge 40 of the lateral force resistance component 26 is pointed in order to more easily insert the lateral force resistance component 26 into the ground during installation. Furthermore, the lateral force resistance component 26 has a greater length 42 than a width 44. This configuration reduces the risk that a force transmitted by the rear support column 20 will cause the lateral force resistance component 26 to bend due to the moment applied by the ground. The lateral force resistance component 26 should be resistant to this deformation. However, the lateral force resistance component 26 may still have a thin thickness, as particularly shown in FIG. 5, so long as it will not bind or deform in the ground.

Figure 6:
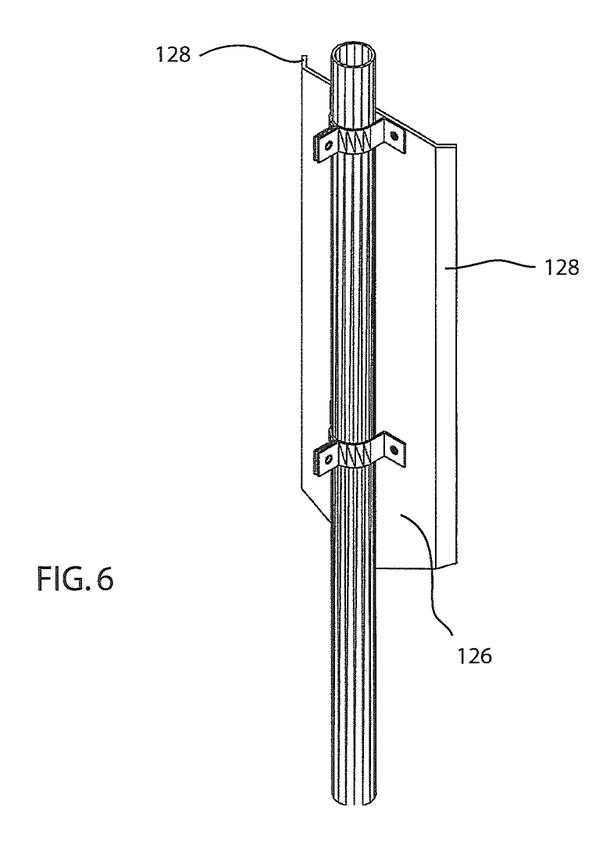
FIG. 6 depicts a perspective view of a lateral force resistance component having bended edges and attached to a support column of a solar array support structure in accordance with one embodiment of the present invention.

As shown in FIG. 6, another embodiment of a lateral force resistance component 126 has bent vertical edges 128. This may help to increase the stiffness of the lateral force resistance 126 to prevent it from bending under the pressure caused by high speed winds. The angles at which the vertical edges 128 are bent are shown in FIG. 6 to be obtuse. However, other appropriate bending angles are contemplated. Furthermore, it should be understood that other shapes and profiles of the lateral force resistance components 26, 126 are contemplated.

During installation of the solar array support structure 10, the support columns 20, 22 may first be installed in the ground without having the lateral force resistance components 26 attached thereto. For example, the support columns 20, 22 having helical piles may be rotatably driven into the ground. Because this requires the support columns 20, 22 to be rotated, lateral force resistance components must be installed after the support columns are secured within the ground 24. Alternately, a post hole may be dug and then the support columns 20, 22 may be inserted and cemented into place and thereby secured in the ground 24.

After the support columns 20, 22 have been installed into the ground, the lateral force resistance components 26 may then be attached to the desired support columns 20, 22. For example, in the embodiment depicted in the Figures, the lateral force resistance components 26 may be attached to the rear support column 20. The lateral force resistance components 26 may be first attached with the clamps 38 loosely and at a location on the support column 20, 22 that is above the surface. The loose attachment should allow the lateral force resistance components 26 to be slidable axially along the columns 20, 22. However, it should be understood that the invention is not limited to the clamps shown and that other attachment mechanisms that allow slidable movement of the lateral force resistance components 26 with respect to the axial columns 20, 22 are contemplated.

Next, the lateral force resistance components may be driven from the location above the surface to the desired location within the ground 24. Once driven to the desired depth, the installer may then tighten one or both clamps 38. In one preferred embodiment, the installer only tightens the clamp 38 that is located proximate the surface of the ground 24 because the second lower clamp 38 is located much deeper within the ground 24 such that it is much more difficult to reach. It should be understood that the attachment of the lateral force resistance components 26 may occur anytime during the installation of the solar array support structure, after the support columns 20, 22 have been installed. For example, the entire mounting structure 14 of the solar array support structure 10 may be installed prior to driving the lateral force resistance components 26 into the ground 24. Alternately, both the mounting structure 14 and the solar array 34 may be installed prior to the installation of the lateral force resistance components 26 within the ground 24.

Like the lateral force resistance components 26, it should be understood that the mounting structure 14 and other components of the solar array support structure 10 are preferably made from steel. However, it should be understood that each of the components may be made from other materials such as Fiberglass, plastic wood, iron, bronze, composites and the like.

Furthermore, it is contemplated that any or all of the components of the solar array support structure 10, as described hereinabove, may be provided in a kit. For example, a solar array installation kit (not show) may include two horizontal rails, such as the horizontal rails 16, 18. The kit may include several top mounting bars, such as the top mounting bars 32. The kit may further include several front and rear support columns, such as the front and rear support columns 22, 20. Additionally, the kit may comprise several cross support bars, such as the cross support bars 36. Finally, the kit may include several lateral force resistance components, such as the lateral force resistance components 26 and several attachment mechanisms, such as the clamps 38, in order to assemble the solar array support structure 10 at the installation site. Alternately, it is contemplated that any or all components of the solar array support structure 10 may be preassembled prior to arrival at the installation site.

It should also be understood that the solar array support structure 10 may not require any concrete to secure the support columns during installation, due to the inherent security provided by the lateral force resistance components 26. For example, support column holes may simply be dug at the installation site for each support column 20, 22. These support column holes may then be refilled by the previously dug soil when the support columns have been inserted to the correct position within the support column holes.

Furthermore, one embodiment may comprise a method of installing a solar array that includes introducing a support column, such as one of the support columns 20, 22, at least partially into the ground, wherein the support column is configured to support a mounting structure, such as the mounting structure 14, and an accompanying solar array, such as the partial array 34. The method may then include attaching a lateral force resistance component, such as the lateral force resistance component 26, to the support column, the lateral force resistance component being dimensioned to reduce pressure on the ground from a force transmitted by the support column in a first direction and a second opposite direction more so than any other two opposite directions located in the same plane as the first and second opposite directions. The method may then include driving the support column to a desired position in the ground.

Still further, in one embodiment the method of driving the support column to the desired position in the ground may be performed after attaching the lateral force resistance component to the support column. Further, the attaching of lateral force resistance components may comprise loosely clamping at least one clamping mechanism, such as the clamps 38, of the lateral force resistance component to the support column such that the support column is rotatable with respect to the lateral force resistance component and such that the support column is movable axially with respect to the lateral force resistance component. Still further, the support column may include helical piles that are located at an end of the support column that is located in the ground, and wherein driving the support column to the desired position in the ground includes rotating the support column.

Moreover, the attaching the lateral force resistance component to the support column may include attaching the lateral force resistance component to the support column at a desired depth in the ground. The method may then comprise tightening at least one clamping mechanism after driving the support column to a desired position in the ground.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A solar array support structure comprising:
a mounting structure extending a length and configured to receive a solar array;
at least one support column extending from the mounting structure into a ground; and
a lateral force resistance component removably attached to the support column in the ground, the lateral force resistance component being at least substantially planar and having a bottom edge that is pointed downward when attached to the at least one support column, the lateral force resistance component oriented parallel with the length of the mounting structure and dimensioned to reduce pressure on the ground from a force transmitted by the support column in a first direction and a second opposite direction more so than any other two opposite directions located in the same plane as the first and second opposite directions, the lateral force resistance component removably attached to the at least one support column with at least one of a clamp element and bolt element such that removal of the at least one of the clamp element and the bolt element allows for the lateral force resistance component to be completely and immediately removed from the at least one support column without sliding the lateral force resistance component over the top or under the bottom of the at least one support column.

2. The solar array support structure of claim 1, wherein the mounting structure further comprises a top horizontal rail and a bottom horizontal rail and a plurality of mounting bars installed above the top and bottom horizontal rails, wherein the mounting bars make a predetermined angle with the ground.

3. The solar array support structure of claim 2, wherein the at least one support column further comprises a plurality of vertical support columns, wherein at least one of the plurality of support columns are connected to each horizontal rail of the mounting structure.

4. The solar array support structure of claim 1, wherein the at least one support column is telescoping such that the height of the mounting structure above the ground is adjustable.

5. The solar array support structure of claim 1, wherein the solar array support structure includes the at least one support column comprising a single vertical support column configured to bear the load of the entire mounting structure and the solar array.

6. The solar array support structure of claim 3, wherein the plurality of support columns are pairs of support columns, each pair comprising a front support column and a rear support column that are each located at the same point along the length of the mounting structure, wherein the front support column is attached to the bottom horizontal rail and the rear support column is attached to the top horizontal rail.

7. The solar array support structure of claim 6, wherein the solar array support structure further comprises a plurality of cross support bars, each individual cross support bar of the plurality of cross support bars attached between each pair of vertical support columns to transfer load from the mounting structure to a base of the rear support column, wherein each cross support bar is attached to the front support column proximate the mounting structure and extends to a lower portion of the rear support column, wherein each cross support bar is configured to mechanically transfer lateral load on the solar array to the rear support column.

8. The solar array support structure of claim 1, wherein the lateral force resistance component is a planar plate extending a first vertical length axially along the at least one support column and extending a second horizontal width tangentially from the support column.

9. The solar array support structure of claim 8, wherein the lateral force resistance component is attached to the at least one support column by two clamps.

10. The solar array support structure of claim 7, wherein the first and the second direction are perpendicular to the length of the solar array support structure and parallel with the cross support bars.

11. The solar array support structure of claim 1, wherein the lateral force resistance component is a flat plate.

12. The solar array support structure of claim 8, wherein the first vertical length is greater than the second horizontal width.

13. The solar array support structure of claim 1, wherein the lateral force resistance component has bent vertical edges.

14. A method of installing a solar array comprising:
introducing a plurality of front support columns at least partially into the ground;
introducing a plurality of rear support columns at least partially into the ground;
attaching a diagonal brace between a top of each of the plurality of front support columns and to a lower location of each of the plurality of rear support columns such that the diagonal braces extend diagonally with respect to the ground;
attaching a mounting structure above the plurality of front and rear support columns;
mounting a solar array to the mounting structure;
driving each of the plurality of front and rear support columns to a desired position in the ground; and
removably attaching a lateral force resistance component to at least one of the plurality of rear support columns, wherein the attaching the lateral force resistant component to the support column is performed after the introducing the columns at least partially into the ground the lateral force resistance component being at least substantially planar and having a bottom edge that is pointed downward when attached to the at least one support column, the lateral force resistance component oriented parallel with a length of the mounting structure and dimensioned to reduce pressure on the ground from a force transmitted by the at least one support column in a first direction and a second opposite direction more so than any other two opposite directions located in the same plane as the first and second opposite directions.

15. The method of installing a solar array of claim 14, wherein the driving the support column to the desired position in the ground is performed after the attaching the lateral force resistance component to the support column.

16. The method of installing a solar array of claim 15, wherein the attaching a lateral force resistance component comprises loosely clamping at least one clamping mechanism of the lateral force resistance component to the support column such that the support column is rotatable with respect to the lateral force resistance component and such that the support column is movable axially with respect to the lateral force resistance component.

17. The method of installing a solar array of claim 16, wherein the support column includes helical piles that are located at an end of the support column that is located in the ground, and wherein driving the support column to the desired position in the ground includes rotating the support column.

18. The method of installing a solar array of claim 17, wherein the attaching the lateral force resistance component to the support column includes attaching the lateral force resistance component to the support column at a desired depth in the ground.

19. The method of installing a solar array of claim 18, further comprising tightening the at least one clamping mechanism after the driving the support column to a desired position in the ground.

20. A solar array support structure comprising:
a plurality of front support columns installed at least partially in the ground;
a plurality of rear support columns installed at least partially in the ground and extending from the ground higher than the plurality of front support columns;
a diagonal brace attached between a top of each of the plurality of front support columns and to a lower location of each of the plurality of rear support columns such that the diagonal braces extend diagonally with respect to the ground;
a first horizontal rail attached to and extending across the top of each of the plurality of front support columns;
a second horizontal rail attached to and extending across the top of each of the plurality of rear support columns;

a plurality of mounting bars installed on top of the first and second horizontal rails such that the plurality of mounting bars are configured to receive an attachable solar array;

at least one lateral force resistance component removably attachable to at least one of the plurality of rear support columns, the at least one lateral force resistance component located at least partially in the ground, the lateral force resistance component being at least substantially planar and having a bottom edge that is pointed downward when attached to the at least one support column, the lateral force resistance component oriented parallel with a length of the first and second horizontal rails and dimensioned to reduce pressure on the ground from a force transmitted by the at least one rear support column in a first direction and a second opposite direction more so than any other two opposite directions located in the same plane as the first and second opposite directions the lateral force resistance component removably attached to the at least one support column with at least one of a clamp element and bolt element such that removal of the at least one of the clamp element and the bolt element allows for the lateral force resistance component to be completely and immediately removed from the at least one support column without sliding the lateral force resistance component over the top or under the bottom of the at least one support column.

* * * * *